US009400403B2

(12) United States Patent
Hesline

(10) Patent No.: US 9,400,403 B2
(45) Date of Patent: Jul. 26, 2016

(54) OPTICAL ISOLATOR, ATTENUATOR, CIRCULATOR AND SWITCH

(71) Applicant: Raymond Hesline, Bilgola (AU)

(72) Inventor: Raymond Hesline, Bilgola (AU)

(73) Assignee: HESLIN PTY LTD, Bilgola (AU)

( * ) Notice: Subject to any disclaimer, the term of this patent is extended or adjusted under 35 U.S.C. 154(b) by 72 days.

(21) Appl. No.: 14/147,538

(22) Filed: Jan. 5, 2014

(65) Prior Publication Data

US 2015/0192805 A1 Jul. 9, 2015

Related U.S. Application Data

(63) Continuation of application No. 10/553,132, filed as application No. PCT/AU2004/000508 on Apr. 16, 2004, now abandoned.

(30) Foreign Application Priority Data

Apr. 17, 2003 (AU) .................................. 2003901831

(51) Int. Cl.
*G02F 1/09* (2006.01)
*G02B 27/28* (2006.01)
*G02B 5/30* (2006.01)

(52) U.S. Cl.
CPC .............. *G02F 1/09* (2013.01); *G02B 27/285* (2013.01); *G02F 1/093* (2013.01); *G02B 5/3083* (2013.01)

(58) Field of Classification Search
CPC .......... G02F 1/09; G02F 1/093; G02B 27/285
USPC .................. 359/256, 483.01, 484.01, 484.02, 359/484.03, 484.04, 489.01, 489.03, 359/489.06, 489.15, 489.16
See application file for complete search history.

(56) References Cited

U.S. PATENT DOCUMENTS

| 5,204,771 | A * | 4/1993 | Koga ............................. 359/281 |
| 5,727,109 | A * | 3/1998 | Pan et al. ....................... 385/140 |
| 5,864,428 | A * | 1/1999 | Hesline .................... 359/485.02 |
| 5,886,780 | A * | 3/1999 | Fukuma et al. ............... 356/128 |
| 6,429,906 | B1 * | 8/2002 | Sekine et al. ...................... 349/9 |
| 2003/0020989 | A1 * | 1/2003 | Liu et al. ........................ 359/161 |
| 2003/0113055 | A1 * | 6/2003 | Zhao et al. ....................... 385/16 |
| 2003/0147136 | A1 * | 8/2003 | Pan et al. ........................ 359/484 |
| 2006/0203340 | A1 * | 9/2006 | Hesline .......................... 359/495 |

* cited by examiner

*Primary Examiner* — Bumsuk Won
*Assistant Examiner* — William R Alexander
(74) *Attorney, Agent, or Firm* — Molins & Co. Pty. Ltd.

(57) ABSTRACT

An optical device comprising a first combination of birefringent prisms with parallel optic axes for dividing an optical input beam into polarized beams, a second combination of birefringent prisms with parallel optic axes for combining polarized beams into an output beam, a polarization changer, and means for improving isolation in optical isolators, attenuators and switches and for improving material costs, light transmission, size and beam capacity in optical isolators, attenuators, switches and circulators.

1 Claim, 20 Drawing Sheets

OPTICAL ISOLATOR, ATTENUATOR, CIRCULATOR AND SWITCH

TECHNICAL FIELD

This invention is a continuation of patent application Ser. No. 10/553,132, filing date Apr. 16, 2004, now abandoned and relates to polarization independent optical isolators, attenuators, circulators and switches.

BACKGROUND ART

Polarization independent optical isolators, attenuators, circulators and switches often use birefringent plates (also referred to as "walk-off" crystals) to divide an optical beam into parallel polarized beams and to combine parallel polarized beams into a single beam.

FIG. 1A shows a birefringent plate of yttrium orthovanadate in which an unpolarized beam of wavelength 1550 nm is so divided. The optic axis of the birefringent plate is in the plane of the drawing and oblique to the input face at an angle of 45 degrees giving an angular beam separation of 5.7 degrees. If separated beams pass through the plate in an opposite direction they may be combined into a single beam.

U.S. Pat. No. 5,864,428 discloses means by which a beam may be divided into parallel polarized beams by use of birefringent prisms. In FIG. 1B a beam of wavelength 1550 nm passes through a 20 degree wedge of yttrium orthovanadate with its optic axis arranged normal to the plane of the drawing so that the beam is separated into polarized beams with an angular beam separation of 5.6 degrees. Component beams then pass through a similar prism to form parallel beams.

As birefringent material is expensive, use of prisms may be advantageous in that the amount of birefringent material may be reduced, so reducing cost. Also, with a space between prisms, one or more polarization rotators may be arranged between prisms to increase optical isolation while maintaining an output free from polarization mode dispersion.

It is therefore an object of this invention to provide a device such as an optical isolator, attenuator, circulator or switch which may be conservative in the use of birefringent material.

It is also an object of the invention to provide a device such as an optical isolator, attenuator, circulator or switch which may be free from polarization mode dispersion and conservative in the use of birefringent material.

It is a further object of the invention to provide a device such as an optical isolator, attenuator, circulator or switch with high optical isolation which may be free from polarization mode dispersion and conservative in the use of birefringent material.

It is a further object of the invention to provide an improved optical isolator.

It is a further object of the invention to provide an improved optical attenuator.

It is a further object of the invention to provide an improved optical circulator.

It is a further object of the invention to provide an improved optical switch.

To this end in accordance with the invention the device may be characterised as an optical isolator, attenuator, circulator or switch comprising a first combination of birefringent prisms with parallel optic axes for dividing an optical input beam into polarized beams, a second combination of birefringent prisms with parallel optic axes for combining polarized beams into an output beam, a first polarization changer disposed between said first combination of birefringent prisms with parallel optic axes for dividing an optical input beam into polarized beams and said second combination of birefringent prisms with parallel optic axes for combining polarized beams into an output beam, a second polarization changer disposed between at least first and last prisms of said first combination of birefringent prisms with parallel optic axes for dividing an optical input beam into polarized beams or first and last prisms of said second combination of birefringent prisms with parallel optic axes for combining polarized beams into an output beam, wherein each birefringent prism of each said combination of birefringent prisms has non parallel input and output faces.

BRIEF DESCRIPTION OF DRAWINGS

FIGS. 7G, 7H, 7I and 7J represent the embodiment depicted in FIG. 7F, showing how beams are isolated.

DESCRIPTION OF PREFERRED EMBODIMENTS

Figure 1A:
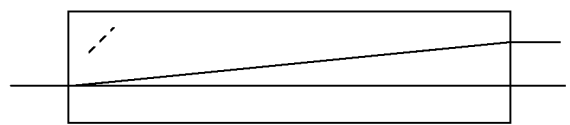
FIG. 1A represents prior art, in which a birefringent plate of yttrium orthovanadate separates an unpolarized beam into polarized beams.
Figure 1B:
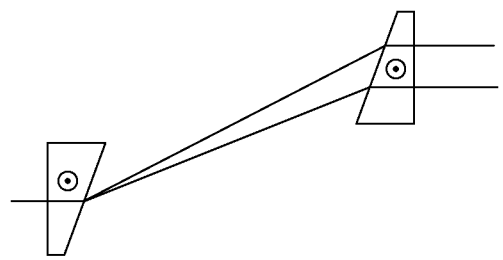
FIG. 1B represents prior art, in which birefringent prisms of yttrium orthovanadate separate an unpolarized beam into polarized beams.
Figure 2A:
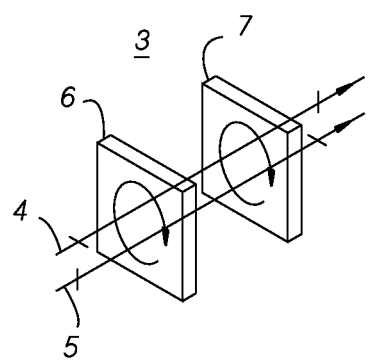
FIG. 2A represents a non reciprocal polarization changer 3, in which a beam passing from left to right has its plane of polarization rotated by 90 degrees.

FIG. 2A represents a non reciprocal polarization changer 3, in which the plane of polarization of a beam entering from the left is rotated through an angle of 90 degrees. As observed from the left, beam 4 passes through Faraday rotator 6 and is rotated in a clockwise direction through an angle of 45 degrees. Beam 4 then passes through half waveplate 7, which has its optic axis arranged so that the plane of polarization of beam 4 is rotated through an additional angle of 45 degrees in a clockwise direction. The plane of polarization of beam 4 is therefore rotated through a total angle of 90 degrees, and the plane of polarization depicted changes from a horizontal orientation to a vertical orientation. Similarly, the plane of polarization of beam 5 is changed from a vertical orientation to a horizontal orientation.

Figure 2B:
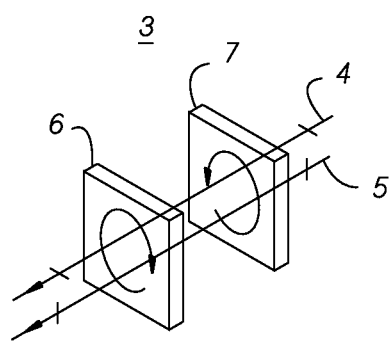
FIG. 2B represents non reciprocal polarization changer 3, in which a beam passing from right to left exits with its plane of polarization unchanged.

FIG. 2B represents non reciprocal polarization changer 3, in which a beam entering from the right exits with its plane of polarization unchanged. As observed from the left, beam 4 passes through half waveplate 7 and is rotated in an anticlockwise direction through an angle of 45 degrees, and then passes through Faraday rotator 6 and is rotated in a clockwise direction through an angle of 45 degrees. The depicted plane of polarization of beam 4 remains in the horizontal plane before and after passing through non reciprocal polarization changer 3 and the plane of polarization of beam 5 remains in the vertical plane before and after passing through non reciprocal polarization changer 3.

Polarization changers are commonly used in optical isolators, attenuators, circulators and switches.

Figure 3A:
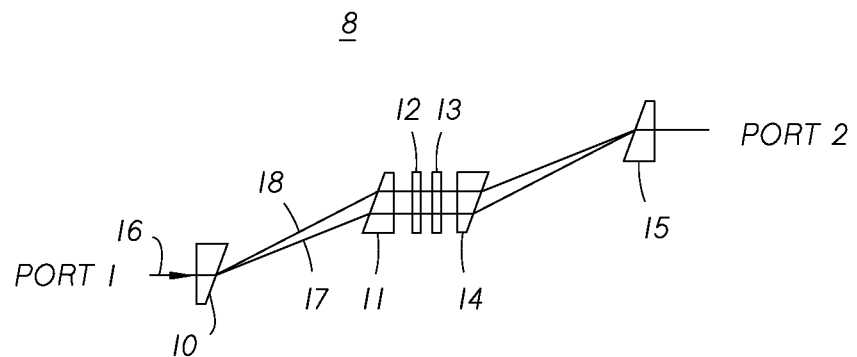
FIG. 3A represents an embodiment in accordance with the invention, being an optical isolator depicting a beam moving from a first port to a second port.

FIG. 3A represents an embodiment in accordance with the invention being an optical isolator 8, comprising birefringent prisms 10 and 11, Faraday rotator 12, half waveplate 13 and birefringent prisms 14 and 15. In this embodiment, birefringent prisms 10, 11, 14 and 15 are composed of yttrium orthovanadate and have their optic axes arranged normal to the plane of the drawing. Birefringent prism pairs 10 and 11, and birefringent prism pairs 14 and 15 are optical devices which divide a beam into parallel, orthogonally polarized beams or combine parallel, orthogonally polarized beams into a single beam.

For this embodiment, a beam 16, entering optical isolator 8 through port 1, passes through birefringent prism 10 to become orthogonally polarized beams 17 and 18. Beams 17 and 18 then pass through birefringent prism 11 to become parallel beams.

Beams 17 and 18 next pass through Faraday rotator 12 and half waveplate 13, passing from left to right, and their planes of polarization are each rotated through an angle of 90 degrees, as shown in FIG. 2A. Beam 17, which was the ordinary beam in birefringent prisms 10 and 11, becomes the extraordinary beam in birefringent prisms 14 and 15. Beam 18 which was the extraordinary beam in birefringent prisms 10 and 11 becomes the ordinary beam in birefringent prisms 14 and 15. Therefore beams 17 and 18 combine between birefringent prisms 14 and 15 to form a single beam which exits through port 2.

Figure 3B:
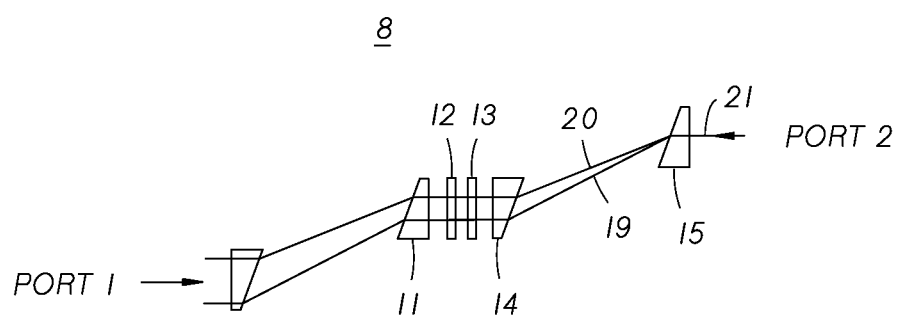
FIG. 3B represents an embodiment in accordance with the invention, being the optical isolator of FIG. 3A showing a beam moving from a second port toward a first port.

FIG. 3B shows a beam 21 entering optical isolator 8 through port 2, wherein beam 21 passes through birefringent prism 15 to become orthogonally polarized beams 19 and 20, which separate and pass through birefringent prism 14 to become parallel beams.

Beams 19 and 20 then pass through half waveplate 13 and Faraday rotator 12 from right to left, and in this direction the beams exit with their planes of polarization unchanged, as shown in FIG. 2B. Beam 19, which was the extraordinary beam in birefringent prisms 15 and 14, remains the extraordinary beam in birefringent prism 11. Beam 20, which was the ordinary beam in birefringent prisms 15 and 14, remains the ordinary beam in birefringent prism 11. Therefore as beams 19 and 20 exit from birefringent prism 11 they continue to separate and do not pass into port 1. Beams pass from port 1 to port 2, but do not pass from port 2 to port 1.

Figure 3C:
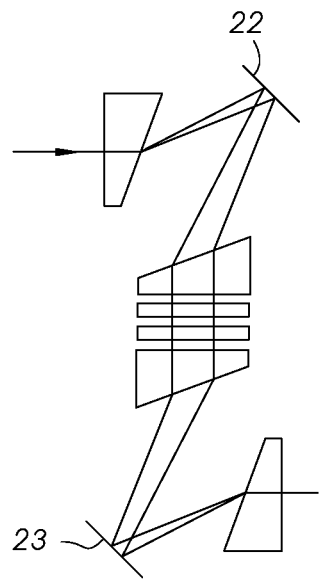
FIG. 3C represents an embodiment in accordance with the invention, being an optical isolator wherein reflective surfaces deflect diverging or converging beams.

FIG. 3C represents an embodiment in accordance with the invention, being an optical isolator similar to isolator 8, wherein reflective surfaces 22 and 23 are arranged between birefringent prisms to reduce isolator size.

Figure 3D:
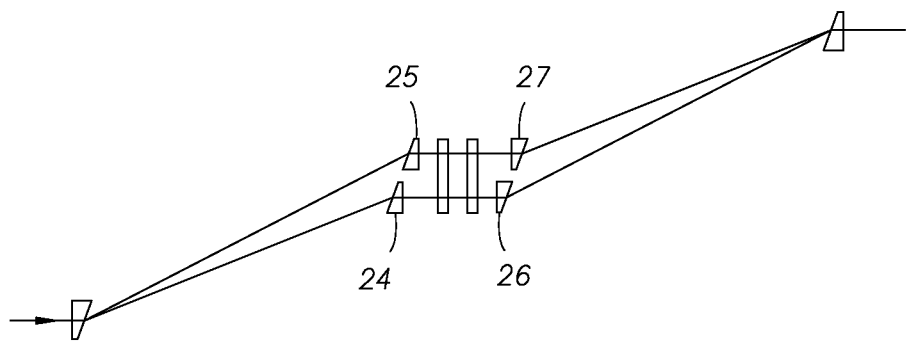
FIG. 3D represents an embodiment in accordance with the invention wherein the amount of birefringent material is further reduced.

FIG. 3D represents an embodiment in accordance with the invention, being an optical isolator similar to isolator 8, wherein the amount of birefringent material is reduced by use of birefringent prisms 24, 25, 26 and 27.

Figure 3E:
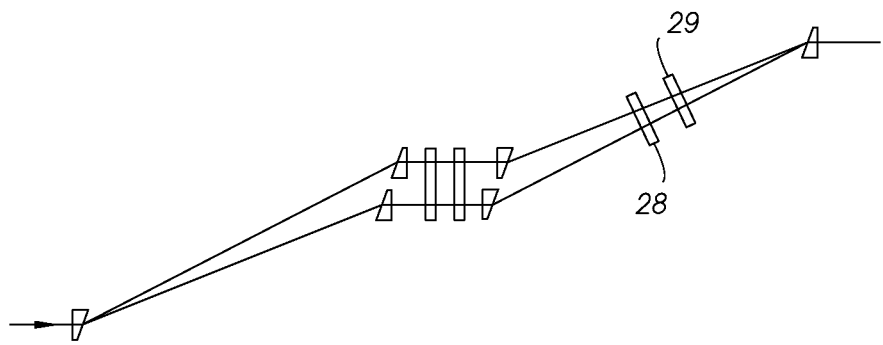
FIGS. 3E and 3F represent an embodiment in accordance with the invention, being an optical isolator with two degrees of isolation.
Figure 3F:
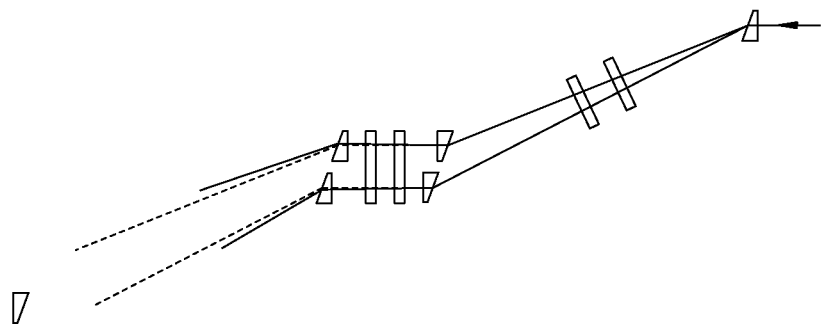

FIGS. 3E and 3F represent an embodiment in accordance with the invention, being an optical isolator with two degrees of isolation.

By including a Faraday rotator 28 and a half waveplate 29 between prisms of the second birefringent prism pair, as shown, a second degree of isolation may be provided. Alternately, Faraday rotator 28 and half waveplate 29 may be places between prisms of the first birefringent prism pair.

Figure 3G:
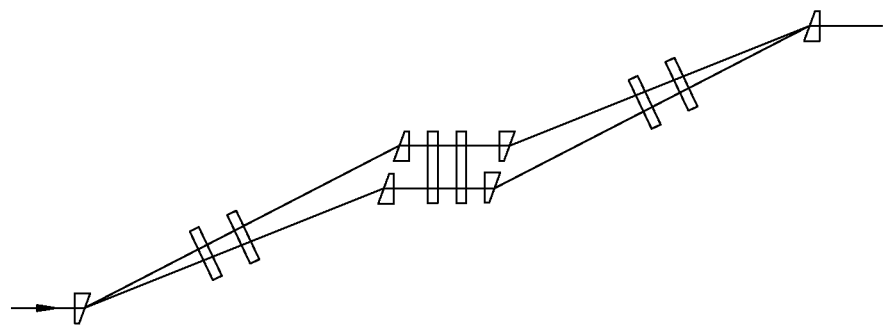
FIGS. 3G and 3H represent an embodiment in accordance with the invention, being an optical isolator with three degrees of isolation.
Figure 3H:
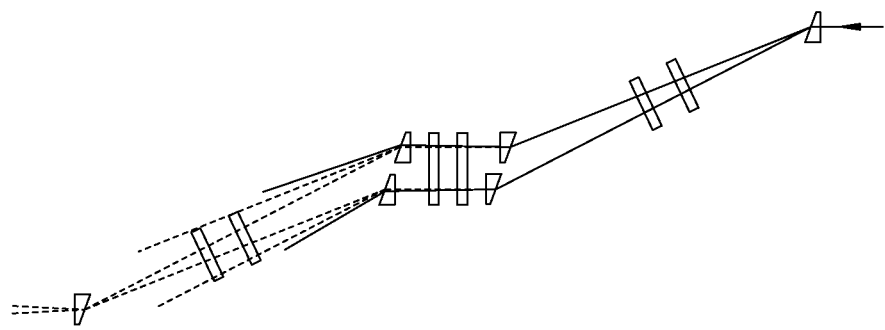

FIGS. 3G and 3H represent an embodiment in accordance with the invention, being an optical isolator with three degrees of isolation.

Figure 4A:
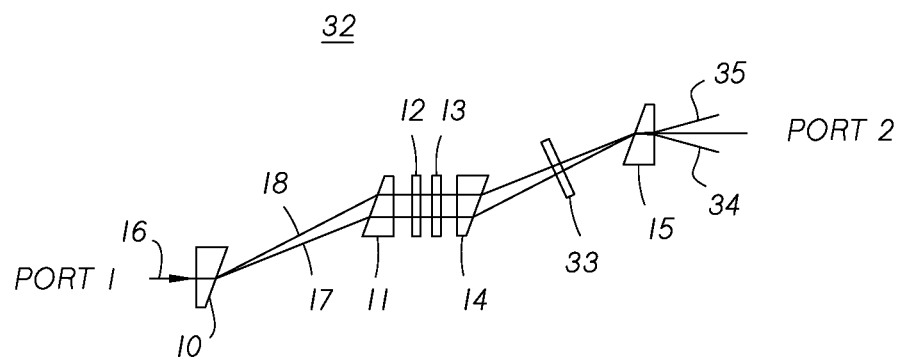
FIG. 4A represents an embodiment in accordance with the invention, being an optical attenuator depicting a beam moving from a first port to a second port.

FIG. 4A represents an embodiment in accordance with the invention being an optical attenuator 32, which is optical isolator 8, with additional element 33 placed between prisms 14 and 15. The purpose of element 33 is to vary the amount of rotation applied to the planes of polarization of beams passing therethrough, so varying the intensity of the optical beam passing into port 2. Element 33 may be, for example, a Faraday rotator or a liquid crystal cell with a variable controller.

The plane of polarization of beam 17, which was the extraordinary beam in prism 14, after being partially rotated by element 33, therefore has two polarization components when passing through prism 15. The extraordinary component continues as in optical isolator 8, while the ordinary component is refracted to exit from prism 15 as beam 35. Similarly, the plane of polarization of beam 18, which was the ordinary beam in prism 14, after being partially rotated by element 33, has two polarization components when passing into prism 15. The ordinary component continues as in optical isolator 8, while the extraordinary component is refracted to exit from prism 15 as beam 34. Beams 34 and 35 disperse and do not enter port 2.

Figure 4B:
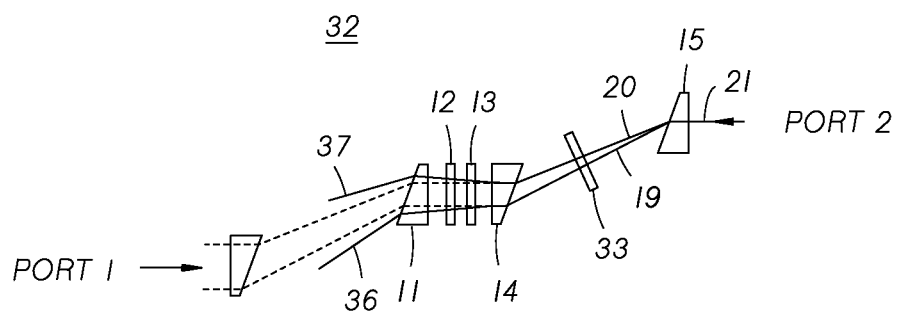
FIG. 4B represents an embodiment in accordance with the invention, being the optical attenuator of FIG. 4A depicting a beam moving from a second port toward a first port.

In a reverse direction, the plane of polarization of beam 19, which was the extraordinary beam in prism 15, after being partially rotated by element 33, has two polarization components when passing into prism 14. The extraordinary component continues as in optical isolator 8, while the ordinary component is refracted to exit as beam 36, as depicted in FIG. 4B. Similarly, the plane of polarization of beam 20, which was the ordinary beam in prism 15, after being partially rotated by element 33, has two polarization components when passing into prism 14. The ordinary component continues as in optical isolator 8, while the extraordinary component is refracted to exit as beam 37, depicted. Beams 36 and 37 disperse and do not enter port 1.

In this embodiment attenuator 32 also acts as an optical isolator. It will be evident that two degrees of isolation can be obtained by including a Faraday rotator and a half waveplate between prisms 10 and 11.

Figure 5A:
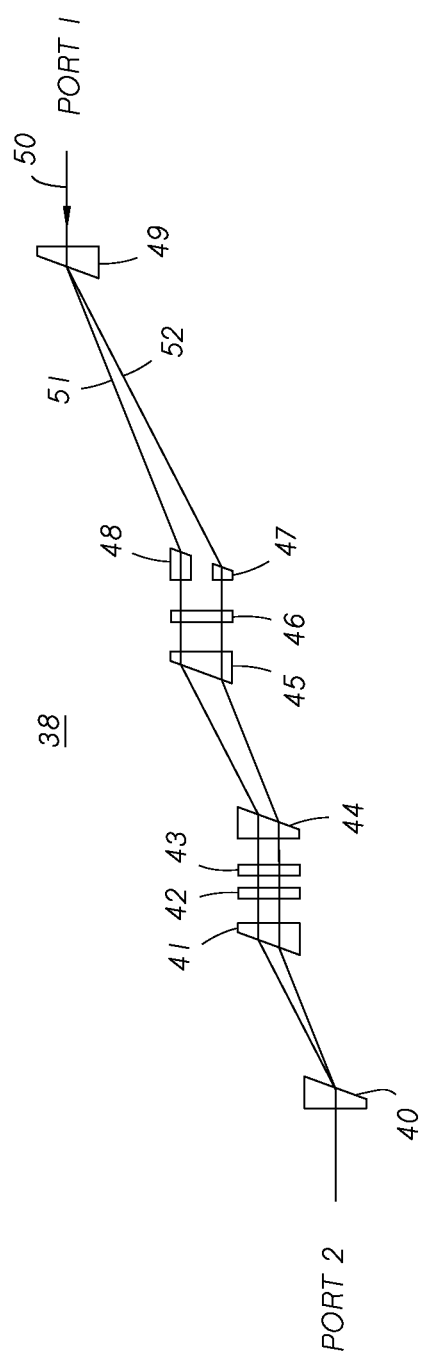
FIG. 5A represents an embodiment in accordance with the invention, being a three port optical circulator showing a beam moving from a first port to a second port.

FIG. 5A represents an embodiment in accordance with the invention being an optical circulator 38, comprising birefringent prisms 40 and 41, Faraday rotator 42, half waveplate 43, birefringent prisms 44 and 45, half waveplate 46 and birefringent prisms 47, 48 and 49. In this embodiment birefringent prisms 40, 41, 44, 45, 47, 48 and 49 are composed of yttrium orthovanadate and have their optic axes arranged normal to the plane of the drawing, and birefringent prism pairs 40 and 41, birefringent prism pairs 44 and 45, and birefringent prisms 47, 48 and 49 are optical devices which divide a beam into parallel, orthogonally polarized beams or combine parallel, orthogonally polarized beams into a single beam.

For this embodiment, a beam entering circulator 38 through port 1, as beam 50, passes through birefringent prism 49 to become orthogonally polarized beams 51 and 52. Beams 51 and 52 then pass through prisms 47 and 48 to become parallel beams. Birefringent prisms 47 and 48 may be separate prisms or may be, for example, a single prism with a hole drilled through the center. Birefringent prisms 47 and 48 may also be a single prism wherein a central beam is deflected by a reflective surface 57 or outer beams are deflected by reflective surfaces 58, 59 and 60, as shown in FIGS. 5C and 5D.

Beams 51 and 52 then pass through half waveplate 46 in which their planes of polarization are each rotated through an angle of 90 degrees. Beam 51, which was the ordinary beam in prism 48, becomes the extraordinary beam in prism 45. Beam 52, which was the extraordinary beam in prism 47, becomes the ordinary beam in prism 45. Therefore beams 51 and 52 pass between prisms 45 and 44 and partially combine.

Beams 51 and 52 next pass through half waveplate 43 and Faraday rotator 42 from right to left, and in this direction beams 51 and 52 exit without any change in their planes of polarization, as shown in FIG. 2B. Beams then pass through prisms 41 and 40 and continue to combine to exit as a single beam through port 2.

Figure 5B:
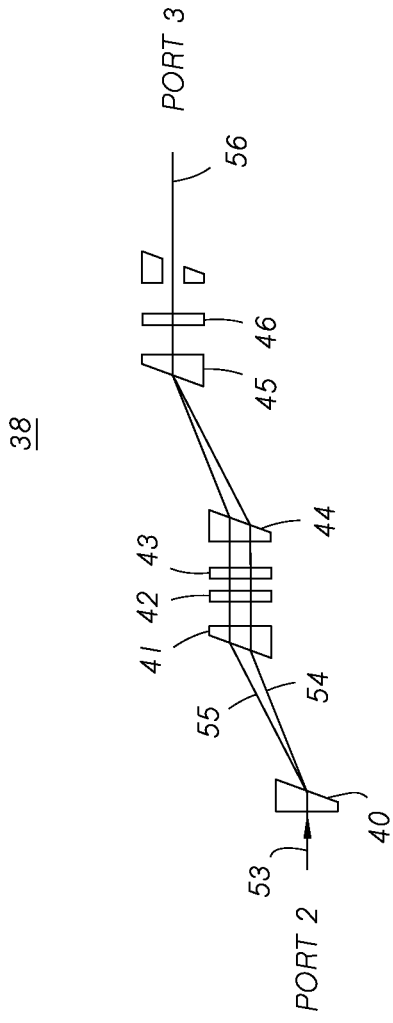
FIG. 5B represents an embodiment in accordance with the invention, being the three port optical circulator of FIG. 5A showing a beam moving from a second port to a third port.
Figure 5C:
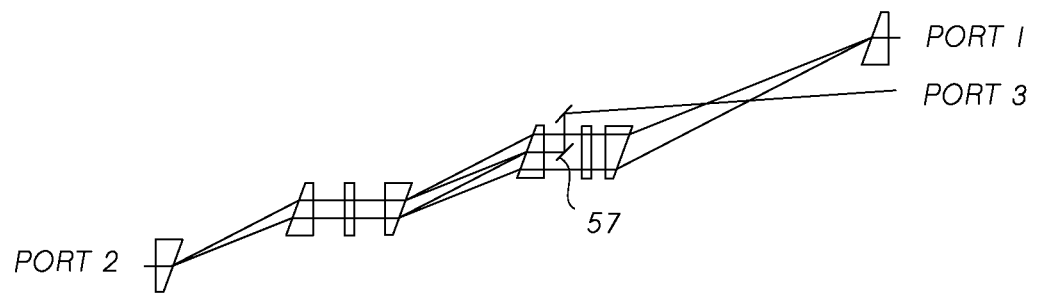
FIG. 5C represents an embodiment in accordance with the invention, being a three port optical circulator wherein a central beam is deflected by a reflective surface.
Figure 5D:
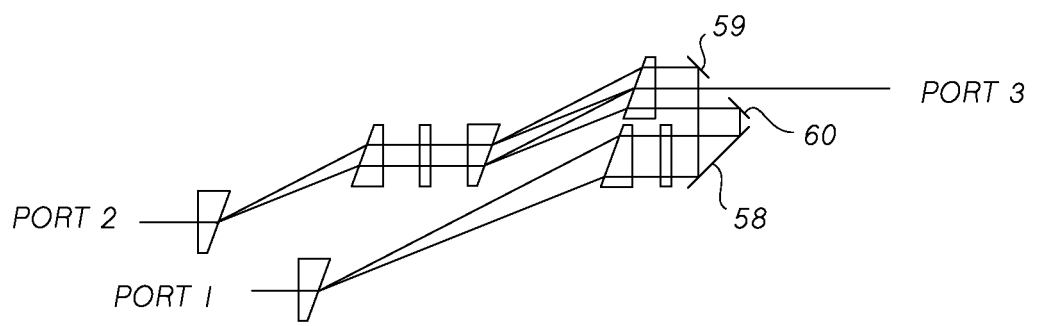
FIG. 5D represents an embodiment in accordance with the invention, being a three port optical circulator in which outer beams are deflected by reflective surfaces.

FIG. 5B shows a beam entering circulator 38 through port 2, as beam 53, wherein beam 53 passes through prism 40 to become orthogonally polarized beams 54 and 55, which separate and pass through prism 41 to become parallel beams.

As beams 54 and 55 pass through Faraday rotator 42 and half waveplate 43 from left to right, their planes of polarization are rotated through an angle of 90 degrees, as depicted in FIG. 2A. Beam 54, which was the ordinary beam in prisms 40 and 41, becomes the extraordinary beam in prisms 44 and 45. Beam 55, which was the extraordinary beam in prisms 40 and 41, becomes the ordinary beam in prisms 44 and 45. Therefore beams 54 and 55 combine between prisms 44 and 45 to become single beam 56, which exits through port 3.

Beam 56 may pass through half waveplate 46. Half waveplate 46 may also have a hole drilled through the center or be two separate elements, one on either side of the path of beam 56. Also, if prisms 47, 48 and 49 have their optic axes oriented vertically in the plane of the drawing, waveplate 46 may be removed altogether.

A beam which enters the device through port 1 exits through port 2 and a beam which enters the device through port 2 exits through port 3, the device being a 3 port optical circulator.

A Faraday rotator and a half waveplate may also be placed between prisms 47, 48 and 49 so that beam 50 passes from port 1 to port 2 as before, but so that port 1 is further isolated from port 2.

Figure 6:
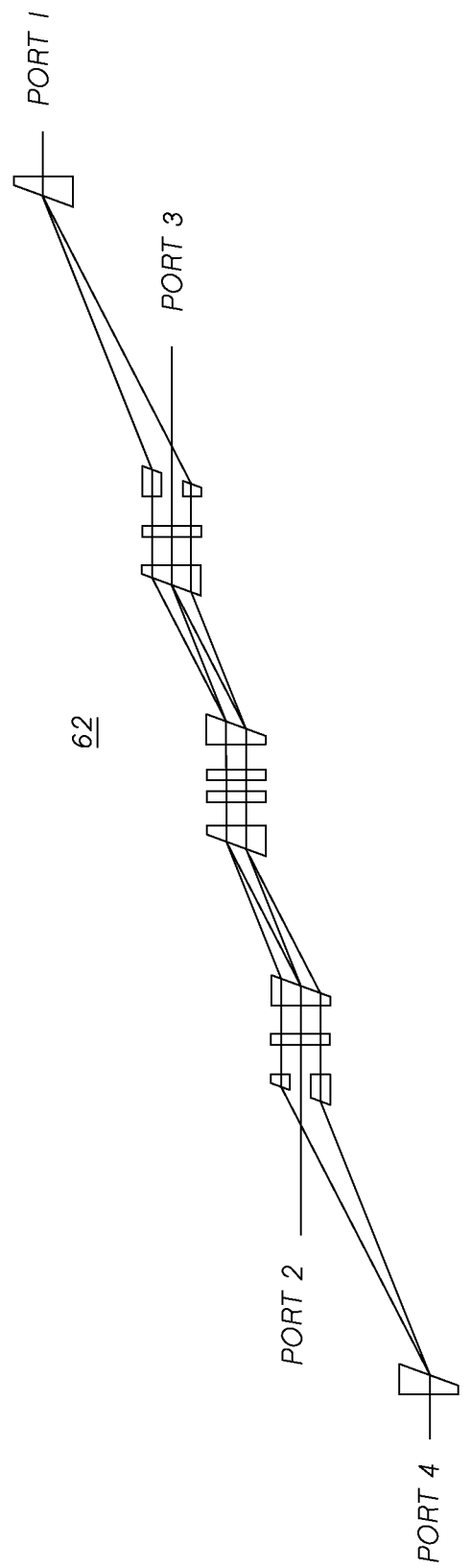
FIG. 6 represents an embodiment in accordance with the invention, being a four port optical circulator.

By adding elements as shown in FIG. 6, a 4 port optical circulator 62 may be formed, in which a beam entering through port 1 exits through port 2, a beam entering through port 2 exits through port 3, a beam entering through port 3 exits through port 4, and a beam entering through port 4 exits through port 1.

Figure 7A:
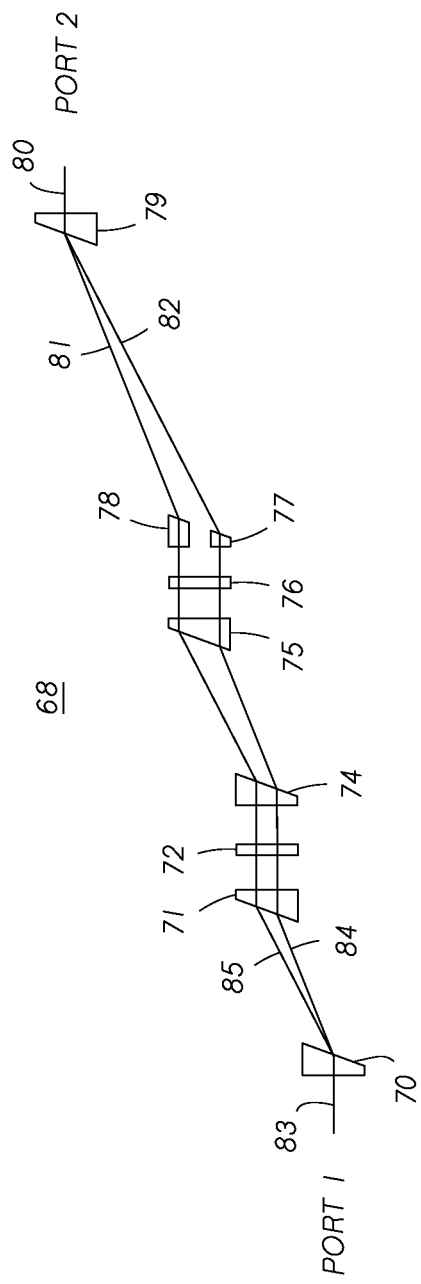
FIG. 7A represents an embodiment in accordance with the invention, being an optical switch showing beams moving between a first port and a second port.
Figure 7B:
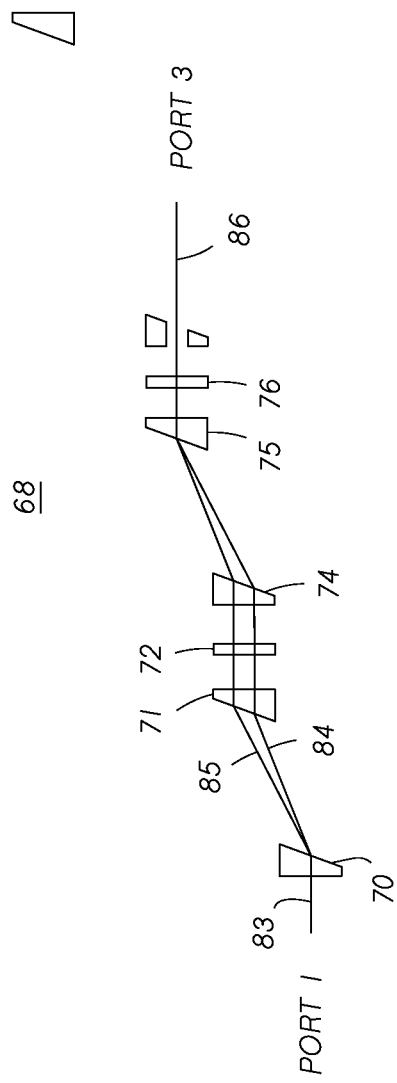
FIG. 7B represents an embodiment in accordance with the invention, being the optical switch of FIG. 7A showing beams moving between a first port and a third port.

FIGS. 7A and 7B represent an embodiment in accordance with the invention being an optical switch 68, comprising birefringent prisms 70 and 71, reciprocal polarization changer 72, birefringent prisms 74 and 75, half waveplate 76 and birefringent prisms 77, 78 and 79. In this embodiment birefringent prisms 70, 71, 74 75, 77, 78 and 79 are composed of yttrium orthovanadate with their optic axes arranged normal to the plane of the drawing, and birefringent prism pairs 70 and 71, birefringent prism pairs 74 and 75, and birefringent prisms 77, 78 and 79 divide a beam into parallel, orthogonally polarized beams or combine parallel, orthogonally polarized beams into a single beam.

Polarization changer 72 may be, for example, a liquid crystal cell or a Faraday rotator with a switching controller. In this embodiment polarization changer 72, when in a first state (hereinafter referred to as the "OFF" state), allows polarized beams to travel in either direction with their planes of polarization unchanged, and when in a second state (hereinafter referred to as the "ON" state), causes the planes of polarization of beams travelling in either direction to be rotated by an angle of 90 degrees.

For this embodiment, a beam entering optical switch 68 through port 1, as beam 83, passes through birefringent prism 70 to become orthogonally polarized beams 84 and 85. Beams 84 and 85 then pass through prism 71 to become parallel beams.

In the OFF state, beams 84 and 85 pass through polarization changer 72 with their planes of polarization unchanged. Beam 84, which was the ordinary beam in prisms 70 and 71, remains the ordinary beam in prisms 74 and 75. Beam 85, which was the extraordinary beam in prisms 70 and 71, remains the extraordinary beam in prisms 74 and 75. Therefore beams 84 and 85 pass between prisms 74 and 75 and continue to separate.

Beams 84 and 85 next pass through half waveplate 76 wherein their planes of polarization are rotated through an angle of 90 degrees. Beam 84, which was the ordinary beam in prism 75, becomes the extraordinary beam in prism 77. Beam 85, which was the extraordinary beam in prism 75, becomes the ordinary beam in prism 78. Beams 84 and 85 then combine between prisms 77, 78 and 79 to exit through prism 79 as single beam 80. Beam 80 leaves through port 2.

Figure 7C:
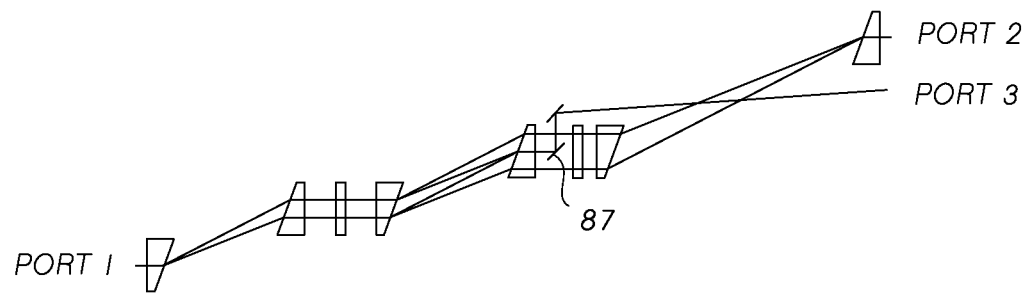
FIG. 7C represents an embodiment in accordance with the invention, being an optical switch in which a central beam is deflected by a reflective surface.
Figure 7D:
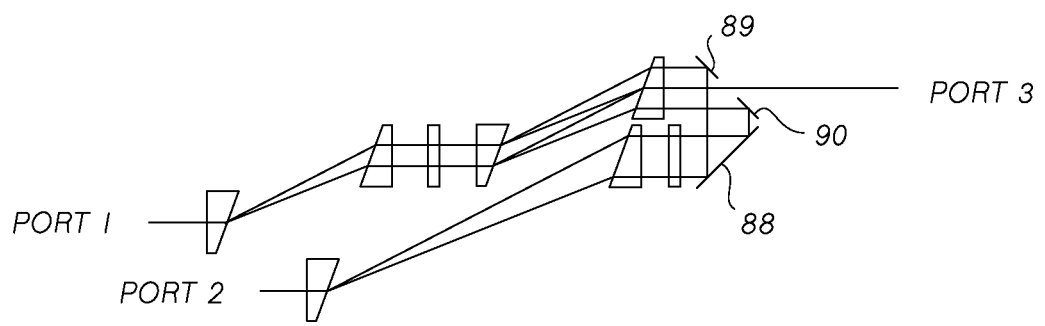
FIG. 7D represents an embodiment in accordance with the invention, being an optical switch in which outer beams are deflected by reflective surfaces.

Birefringent prisms 77 and 78 may be separate prisms or may be, for example, a single prism with a hole drilled through the center. Birefringent prisms 77 and 78 may also be a single prism, wherein a central beam is deflected by a reflective surface 87, as shown in FIG. 7C, or by reflective surfaces 88, 89 and 90, as shown in FIG. 7D.

For a beam passing through optical switch 68 in a reverse direction, as beam 80, beam 80 passes through birefringent prism 79 and divides into orthogonally polarised beams 81 and 82. Beams 81 and 82 then retrace the paths of beams 84 and 85 to exit as single beam 83. Beam 83 leaves through port 1.

In the ON state, beams 84 and 85 pass through polarization changer 72 where their planes of polarization are rotated through an angle of 90 degrees. Beam 84, which was the ordinary beam in prisms 70 and 71, becomes the extraordinary beam in prisms 74 and 75. Beam 85, which was the extraordinary beam in prisms 70 and 71, becomes the ordinary beam in prisms 74 and 75. Beams 84 and 85 therefore pass between prisms 74 and 75 and combine to exit as beam 86. Beam 86 leaves through port 3.

Beam 86 may pass through half waveplate 76. Half waveplate 76 may also have a hole drilled through the center or be two separate elements, one on either side of the path of beam 86.

Also, if prisms 77, 78 and 79 have their optic axes oriented vertically in the plane of the drawing, waveplate 76 may be removed altogether.

For a beam passing through optical switch 68 in a reverse directions, beam 86 retraces the paths of beams 84 and 85 to exit as single beam 83. Beam 83 leaves through port 1.

Two way communication between ports 1 and 2 can therefore be switched to two way communication between ports 1 and 3 by changing the state of reciprocal polarization changer 72 from the OFF state to the ON state, or from the ON state to the OFF state.

Figure 7E:
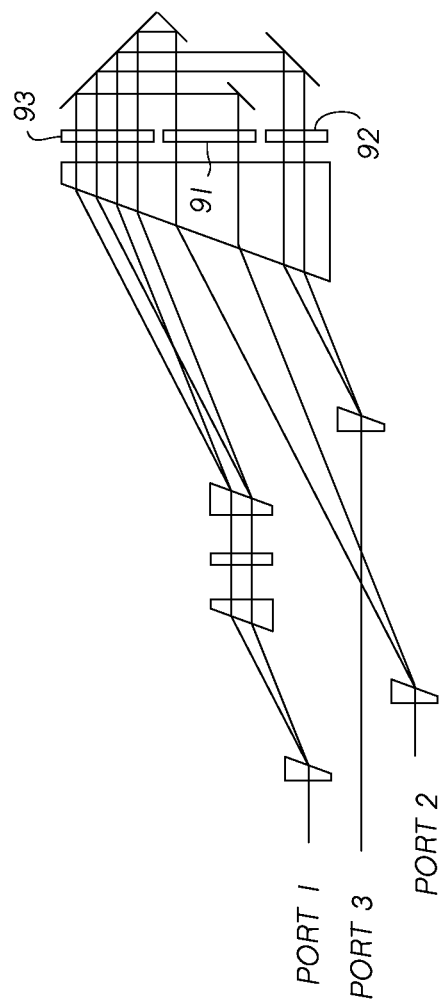
FIG. 7E represents an embodiment in accordance with the invention, being an optical switch with two degrees of isolation.

FIG. 7E represents an embodiment in accordance with the invention, being an optical switch with two degrees of isolation. Element 93 is a half waveplate as in the previous embodiment and elements 91 and 92 are reciprocal rotators. When optical beams pass between ports 1 and 2, and polarization rotator 92 is in the ON state, residual beams may be disrupted from passing between ports 1 and 3. Similarly, when optical beams pass between ports 1 and 3, and polarization rotator 91 is in the ON state, residual beams may be disrupted from passing between ports 1 and 2.

Figure 7F:
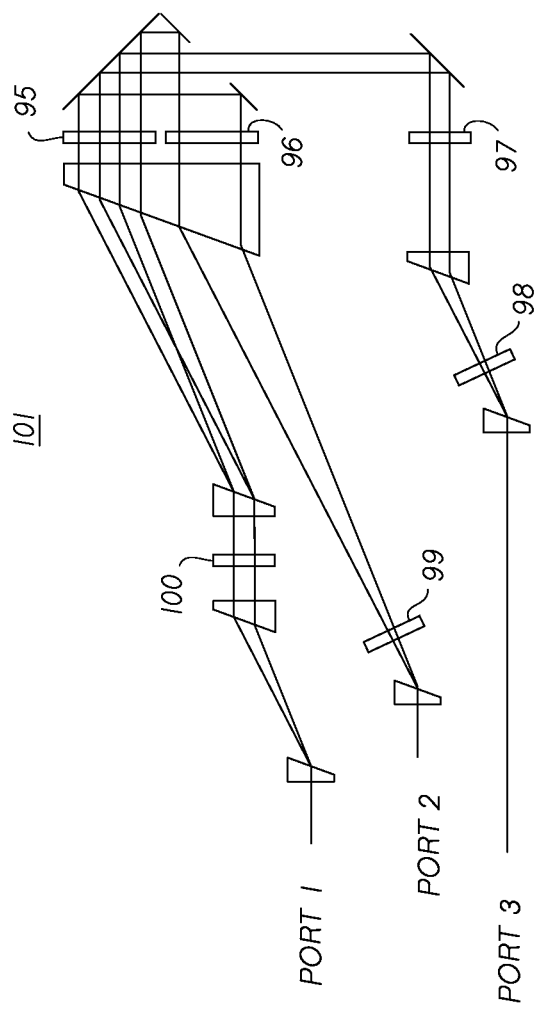
FIG. 7F represents an embodiment in accordance with the invention, being an optical switch with three degrees of isolation.

FIG. 7F represents an embodiment in accordance with the invention, being an optical switch 101 with three degrees of isolation. Element 95 is a half waveplate as in the previous embodiment and elements 100, 96, 97, 98 and 99 are reciprocal rotators. When optical beams pass between ports 1 and 2, residual beams may be disrupted from passing between ports 1 and 3. When optical beams pass between ports 1 and 3, residual beams may be disrupted from passing between ports 1 and 2.

FIGS. 7G, 7H, 7I and 7J represent optical switch 101, showing how beams are disrupted.

Figure 7G:
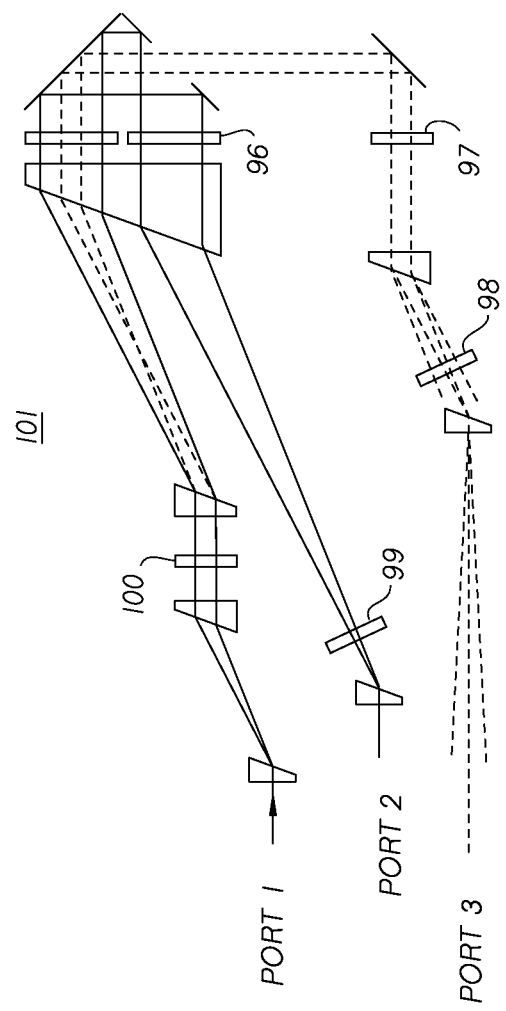

FIG. 7G represents optical switch 101, wherein reciprocal rotators are in the following states: 100 OFF, 96 OFF, 99 OFF, 97 ON, 98 ON.

Figure 7H:
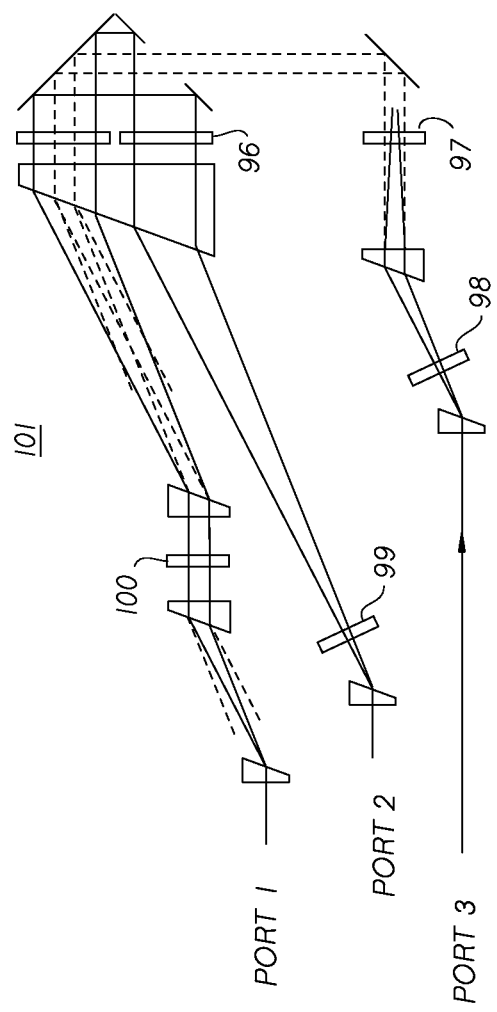
Figure 71:
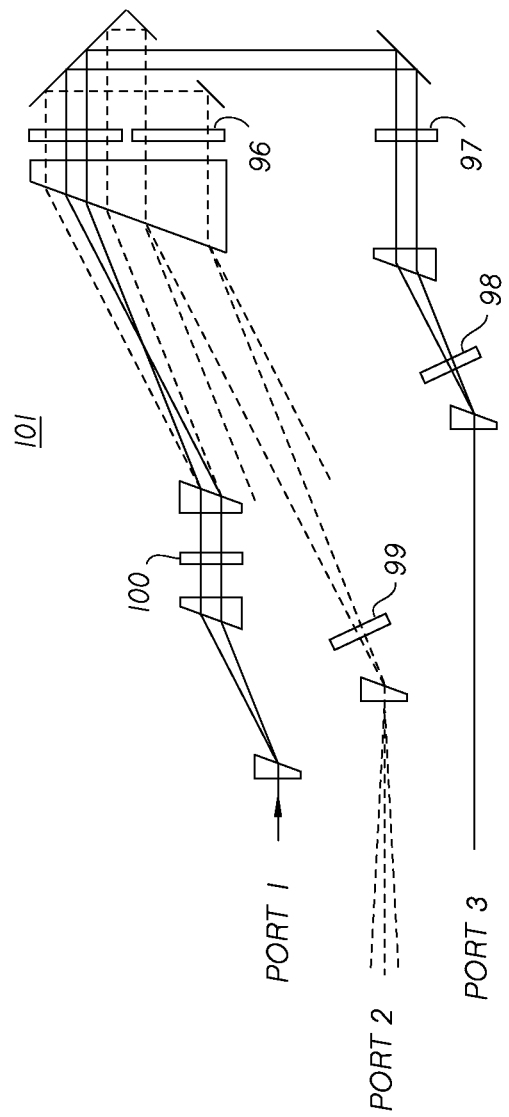

FIG. 7H represents optical switch 101, wherein reciprocal rotators are in the following states: 100 OFF, 96 OFF, 99 OFF, 97 ON, 98 ON.

FIG. 7I represents optical switch 101, wherein reciprocal rotators are in the following states: 100 ON, 97 OFF, 98 OFF, 96 ON, 99 ON.

Figure 7J:
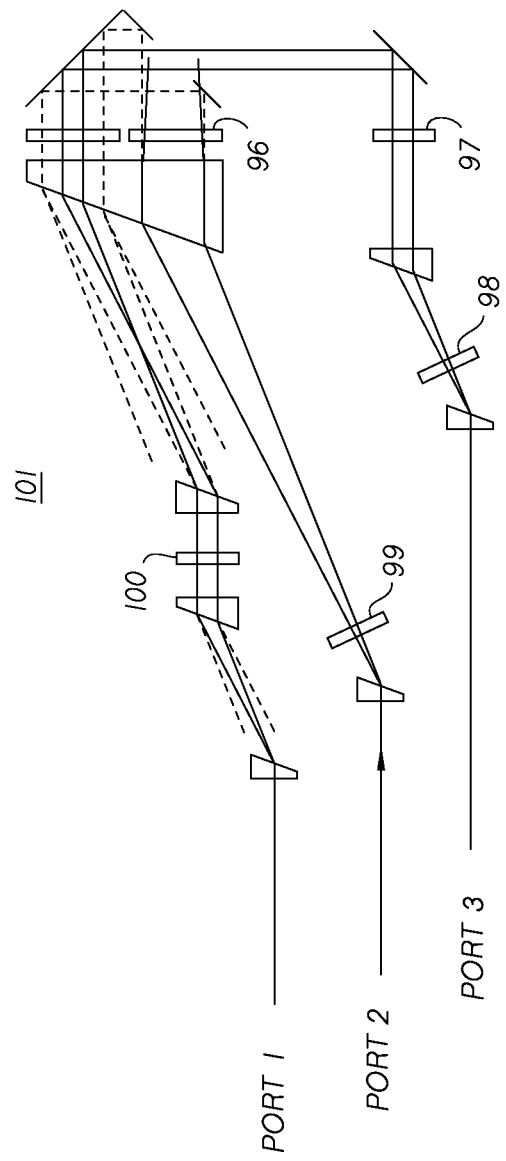

FIG. 7J represents optical switch 101, wherein reciprocal rotators are in the following states: 100 ON, 97 OFF, 98 OFF, 96 ON, 99 ON.

The devices described herein are free from polarization mode dispersion, may accommodate various frequencies or signals and may be composed of various materials. By way of example, prisms may be composed of yttrium orthovanadate, rutile, calcite, alpha-barium borate or lithium niobate and Faraday rotators may be composed of various magneto-optic materials as described, for example, in U.S. Pat. No. 5,608,570 by Brandle et al.

Modifications and variations to the described embodiments will be apparent to those skilled in the art and all such modifications and variations should be considered as within the scope of the present invention.

The invention claimed is:

1. An optical device comprising a first combination of birefringent prisms with parallel optic axes for dividing an optical input beam into polarized beams, a second combination of birefringent prisms with parallel optic axes for combining polarized beams into an output beam, a first polarization changer disposed between said first combination of birefringent prisms with parallel optic axes for dividing an optical input beam into polarized beams and said second combination of birefringent prisms with parallel optic axes for combining polarized beams into an output beam, a second polarization changer disposed between at least first and last prisms of said first combination of birefringent prisms with parallel optic axes for dividing an optical input beam into polarized beams or first and last prisms of said second combination of birefringent prisms with parallel optic axes for combining polarized beams into an output beam, wherein each birefringent prism of each said combination of birefringent prisms has non parallel input and output faces.

\* \* \* \* \*